United States Patent
Bliek et al.

(10) Patent No.: US 12,404,829 B2
(45) Date of Patent: Sep. 2, 2025

(54) ENERGY STORAGE SYSTEM FOR STORING ENERGY IN A WATERBODY

(71) Applicant: OCEAN GRAZER B.V., Groningen (NL)

(72) Inventors: Frederik Willem Bliek, Westerbroek (NL); Anne Max Duursma, Winschoten (NL); Marijn Van Rooij, Paterswolde (NL)

(73) Assignee: OCEAN GRAZER B.V., Groningen (NL)

( * ) Notice: Subject to any disclaimer, the term of this patent is extended or adjusted under 35 U.S.C. 154(b) by 0 days.

(21) Appl. No.: 18/573,065

(22) PCT Filed: Jun. 24, 2022

(86) PCT No.: PCT/NL2022/050362
§ 371 (c)(1),
(2) Date: Dec. 21, 2023

(87) PCT Pub. No.: WO2023/277682
PCT Pub. Date: Jan. 5, 2023

(65) Prior Publication Data
US 2024/0318620 A1 Sep. 26, 2024

(30) Foreign Application Priority Data
Jun. 28, 2021 (EP) ..................... 21182078

(51) Int. Cl.
*F03B 3/10* (2006.01)
*F03B 13/06* (2006.01)
*F03B 13/26* (2006.01)

(52) U.S. Cl.
CPC ............... *F03B 3/10* (2013.01); *F03B 13/06* (2013.01); *F03B 13/26* (2013.01);
(Continued)

(58) Field of Classification Search
CPC .... F03B 13/06; F03B 13/26; F05B 2260/422; Y02E 10/30; Y02E 60/16
(Continued)

(56) References Cited

U.S. PATENT DOCUMENTS 3,939,356 A * 2/1976 Loane ..................... F02C 6/16
60/398
3,988,897 A * 11/1976 Strub ...................... F02C 7/143
60/659
(Continued)

FOREIGN PATENT DOCUMENTS

| DE | 102011107835 A1 | 1/2013 |
| EP | 0599691 A1 | 6/1994 |

(Continued)

OTHER PUBLICATIONS

International Search Report for PCT/NL2022/050362 dated Sep. 12, 2022, 3 pages.

*Primary Examiner* — Matthew Wiblin
(74) *Attorney, Agent, or Firm* — Chrisman, Gallo, Tochtrop LLC

(57) ABSTRACT

The invention provides an energy storage system (1) for storing energy in a waterbody (2), such as a sea, an ocean, a waterway, etc. The energy storage system comprises a reservoir structure (8A, 8B, 8C, 9A, 9B, 9C) for a working liquid (7) and an energy storing and retrieving subsystem (10A, 10B). The working liquid (7) in the reservoir structure is completely separated from the water (6) of the waterbody. The reservoir structure comprises a deformable pressurizing subreservoir (8A), which is extending in the waterbody, and which has a liquid-impermeable deformable wall structure (18). The reservoir structure further comprises a buried depressurizing subreservoir (9A), which is an artificial structure, which has been buried under a vertical column of a waterbody underground (5). The energy storage system
(Continued)

provides, inter alia, improved energy storage capacity and improved reliability, as well as reduced operational costs and reduced environmental disturbance.

11 Claims, 3 Drawing Sheets

(52) U.S. Cl.
CPC ......... *F05B 2260/422* (2020.08); *Y02E 10/30* (2013.01); *Y02E 60/16* (2013.01)

(58) Field of Classification Search
USPC .......................................................... 60/398
See application file for complete search history.

(56) References Cited

U.S. PATENT DOCUMENTS

| | | | | |
|---|---|---|---|---|
| 3,996,741 A * | 12/1976 | Herberg | ................... | F03D 9/28 60/501 |
| 4,310,769 A * | 1/1982 | Mazzone | ................ | F03B 13/06 290/1 R |
| 7,281,371 B1 * | 10/2007 | Heidenreich | ........... | F03B 13/06 60/398 |
| 8,215,104 B2 * | 7/2012 | Riley | ...................... | F24T 10/20 60/398 |
| 10,707,802 B1 * | 7/2020 | Materna | .................. | H02S 20/32 |
| 12,110,648 B2 * | 10/2024 | Gudesen | .................. | E02B 9/00 |
| 2008/0136186 A1 * | 6/2008 | Gogoana | ................. | F15B 1/024 290/43 |
| 2015/0184679 A1 * | 7/2015 | Ivy | .......................... | F15B 1/024 60/398 |

FOREIGN PATENT DOCUMENTS

| | | | | |
|---|---|---|---|---|
| GB | 2532744 A | 6/2016 | | |
| JP | S63239319 A | 10/1988 | | |
| WO | WO-2016040731 A1 * | 3/2016 | ............. | F03B 13/06 |
| WO | 2019117711 A1 | 6/2019 | | |
| WO | 2021125969 A1 | 6/2021 | | |

\* cited by examiner

ENERGY STORAGE SYSTEM FOR STORING ENERGY IN A WATERBODY

The invention relates to an energy storage system for storing energy in a waterbody, the waterbody having a water surface and a bottom surface, said bottom surface bounding waterbody underground under the waterbody, wherein the energy storage system comprises:
- a reservoir structure, which comprises a pressurizing reservoir and a depressurizing reservoir, each of which is configured for holding a working liquid beneath the water surface of the waterbody and separated from the water of the waterbody, wherein:
  - at least one deformable pressurizing subreservoir of the pressurizing reservoir is at least partly extending in the waterbody, has a deformable wall structure, and is configured for pressurizing the working liquid contained within the pressurizing reservoir by deformation of the deformable wall structure under influence of the hydrostatic pressure of the water of the waterbody acting on the deformable wall structure, and
  - the depressurizing reservoir is arranged and configured for shielding the working liquid within the depressurizing reservoir from pressurization under influence of the hydrostatic pressure of the water of the waterbody;
- an energy storing and retrieving subsystem configured for:
  - guiding the working liquid to flow from the pressurizing reservoir into the depressurizing reservoir, and vice versa,
  - storing energy by increasing the potential energy of the working liquid within the reservoir structure by displacing part of the working liquid from the depressurizing reservoir into the pressurizing reservoir, and
  - retrieving stored energy by decreasing the potential energy of the working liquid within the reservoir structure by releasing part of the working liquid to flow from the pressurizing reservoir into the depressurizing reservoir.

An energy storage system of the type as mentioned above is known from WO 2019/117711 A1.

In the present context it is noted that the term "waterbody", as used throughout the present document, refers to a sea, an ocean, a waterway, or other similarly large water basin.

It is an object of the present invention to provide at least an alternative energy storage system, which provides improvements over known energy storage systems.

For that purpose, the invention provides an energy storage system of the type as initially identified above, and further characterized in that:
- at least one buried depressurizing subreservoir of the depressurizing reservoir is buried under a vertical column of said waterbody underground, wherein said vertical column has a height of at least 5 meters, and
- said at least one buried depressurizing subreservoir is arranged at least 5 meters lower than said at least one deformable pressurizing subreservoir, which is extending in the waterbody, in the sense that, in operation of the energy storage system, the working liquid inside said at least one buried depressurizing subreservoir is at least 5 meters lower than the working liquid inside said at least one deformable pressurizing subreservoir.

More explicitly stated, the invention provides an energy storage system according to the appended independent claim 1. Preferable embodiments of the invention are provided by the appended dependent claims 2-9.

As compared to the energy storage system known from FIG. 1 or FIG. 2 of the above-mentioned document WO 2019/117711 A1, the present energy storage system according to the present invention has a different reservoir structure.

The major differences are elucidated as follows. The left-hand side of FIG. 1 of WO 2019/117711 A1 shows the pressurizing reservoir 7A having the deformable wall structure 17A, as well as the depressurizing reservoir 8A having the rigid wall structure 18A. Both reservoirs 7A and 8A are containing the working liquid 9. It is seen that the depressurizing reservoir 8A neither is buried under a vertical column of waterbody underground, nor is arranged at least 5 meters lower than the pressurizing reservoir 7A.

The different reservoir structure of the energy storage system according to the present invention provides various advantages over the energy storage system known from WO 2019/117711 A1. These advantages are explained as follows.

The two distinguishing features of the present invention that said at least one buried depressurizing subreservoir (i) is arranged substantially lower than said at least one deformable pressurizing subreservoir, which is extending in the waterbody, and (ii) is buried as mentioned, provide increased head which provides a higher energy storage capacity per unit of volume of the reservoir structure. The reason for this increased head is that the hydrostatic pressure, prevailing at the working liquid exchange locations where the working liquid is to be displaced from the depressurizing reservoir into the pressurizing reservoir for energy storage and is released to flow vice versa for energy retrieval, increases when the total vertical height of the water in the waterbody and of the working liquid in the pressurizing reservoir, as measured from the water surface of the waterbody downwards to said working liquid exchange locations, is increased. Such an increased head results into a required higher energy to be delivered by the energy storing and retrieving subsystem for storing energy by displacing part of the working liquid from the depressurizing reservoir into the pressurizing reservoir against the higher pressure of such an increased head. Analogously, such an increased head furthermore results into a higher energy yield to be received by the energy storing and retrieving subsystem when retrieving stored energy by releasing part of the working liquid to flow from the pressurizing reservoir into the depressurizing reservoir under the higher pressure of such an increased head.

In addition to the above-explained advantage of a higher energy storage capacity per unit of volume of the reservoir structure, said two distinguishing features of the present invention provide further important advantages. To explain these further advantages, it is noted that the reservoir structure known from WO 2019/117711 A1 has a buoyancy when empty. According to the present invention, on the other hand, the at least one buried depressurizing subreservoir being buried under a vertical column of said waterbody underground, automatically ballasts the at least one buried depressurizing subreservoir relative to the waterbody underground. Furthermore, a partly buried reservoir structure as according to the present invention minimizes the exposure of the reservoir structure at the bottom of the waterbody (e.g. a seabed) and therefore improves reliability, reduces forces from currents and waves acting on the reservoir structure and reduces costs for scour protection. In case of future decommissioning of the reservoir structure, or of parts thereof, the at least one buried depressurizing subreservoir can remain buried, which reduces costs of decommissioning and minimizes disturbance of seabeds.

In a preferable embodiment of the invention, the energy storage system further comprises a shaft structure, wherein:
  the shaft structure is extending at least from the bottom surface of the waterbody downwards through said waterbody underground,
  at least one descending pressurizing subreservoir of the pressurizing reservoir is extending in or at the shaft structure and downwards along the shaft structure, and
  the energy storing and retrieving subsystem is at least partly located in or at the shaft structure so as to effect that:
    said displacing part of the working liquid from the depressurizing reservoir into the pressurizing reservoir, and
    said releasing part of the working liquid to flow from the pressurizing reservoir into the depressurizing reservoir,
  take place in or at the shaft structure and via said at least one descending pressurizing subreservoir.

In another preferable embodiment of the invention, or of the above-mentioned preferable embodiment thereof, said energy storing and retrieving subsystem comprises at least one pump for said displacing part of the working liquid from the depressurizing reservoir into the pressurizing reservoir.

In yet another preferable embodiment of the invention, or of any one of the above-mentioned preferable embodiments thereof, said energy storing and retrieving subsystem comprises at least one turbine for said releasing part of the working liquid to flow from the pressurizing reservoir into the depressurizing reservoir.

In yet another preferable embodiment of the invention, or of any one of the above-mentioned preferable embodiments thereof, said energy storing and retrieving subsystem comprises at least one reversible hydroelectric turbine, which can operate both as a turbine-generator and, in reverse, as an electric motor-driven pump, for said displacing part of the working liquid from the depressurizing reservoir into the pressurizing reservoir, as well as for said releasing part of the working liquid to flow from the pressurizing reservoir into the depressurizing reservoir.

In yet another preferable embodiment of the invention, or of any one of the above-mentioned preferable embodiments thereof:
  said vertical column has a height of at least 10 meters, and
  said at least one buried depressurizing subreservoir is arranged at least 10 meters lower than said at least one deformable pressurizing subreservoir, which is extending in the waterbody, in the sense that, in operation of the energy storage system, the working liquid inside said at least one buried depressurizing subreservoir is at least 10 meters lower than the working liquid inside said at least one deformable pressurizing subreservoir.

In yet another preferable embodiment of the invention, or of any one of the above-mentioned preferable embodiments thereof:
  a horizontal flatness ratio of said at least one buried depressurizing subreservoir is at least 2.0, preferably at least 4.0, and more preferably at least 8.0,
  said horizontal flatness ratio being defined as a quotient having a numerator and a denominator,
  wherein the numerator is the square root of a surface area of a projection area of a horizontal reference plane, said projection area being obtained by vertically projecting said at least one buried depressurizing subreservoir onto said horizontal reference plane,
  and wherein the denominator is the overall vertical height of said at least one buried depressurizing subreservoir.

The above-mentioned aspects and other aspects of the invention will be apparent from and elucidated with reference to the embodiments described hereinafter by way of non-limiting examples only and with reference to the schematic figures in the enclosed drawing.

Figure 1:
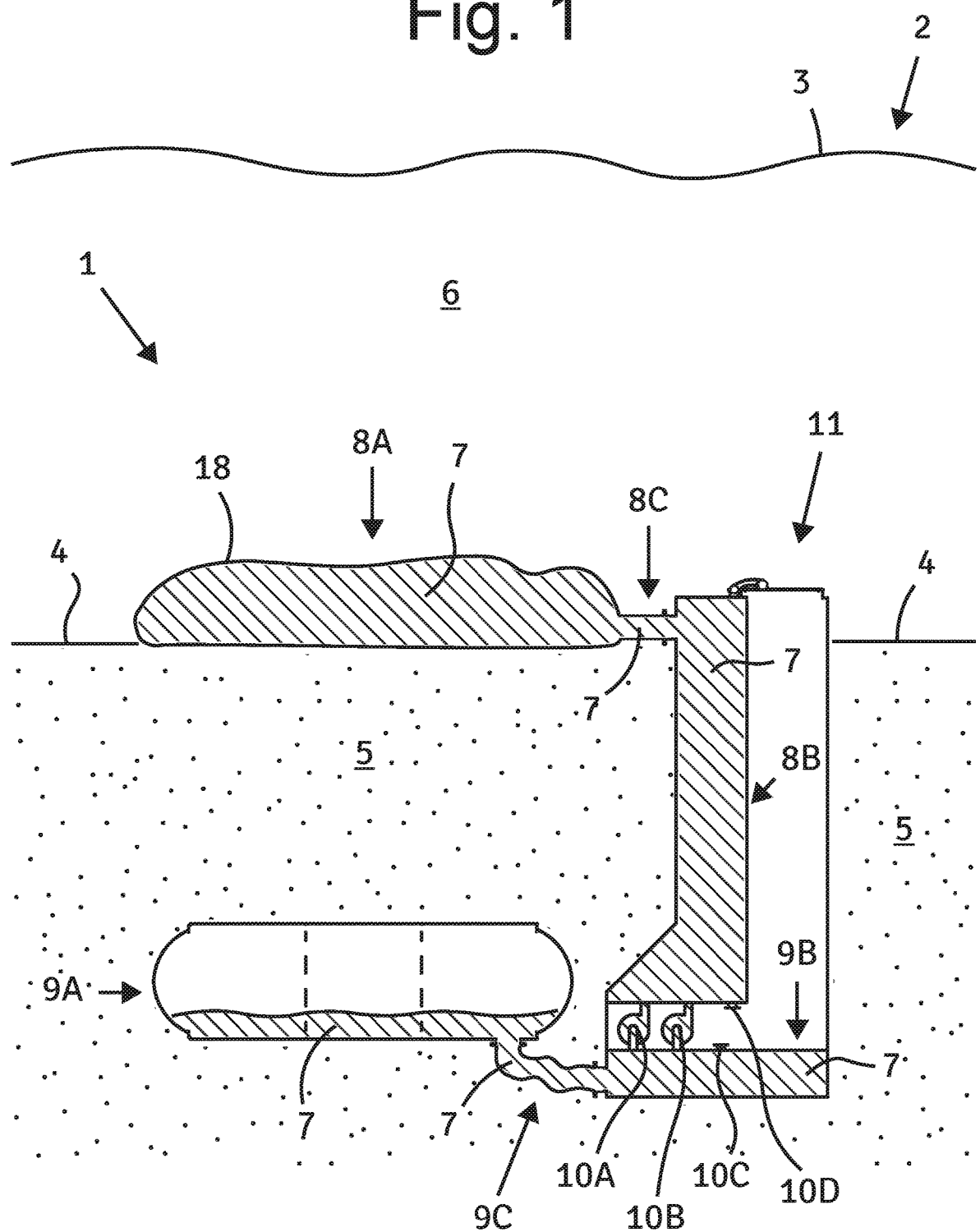
FIG. 1 shows, in vertical cross-section, an example of an embodiment of an energy storage system according to the invention.
Figure 2:
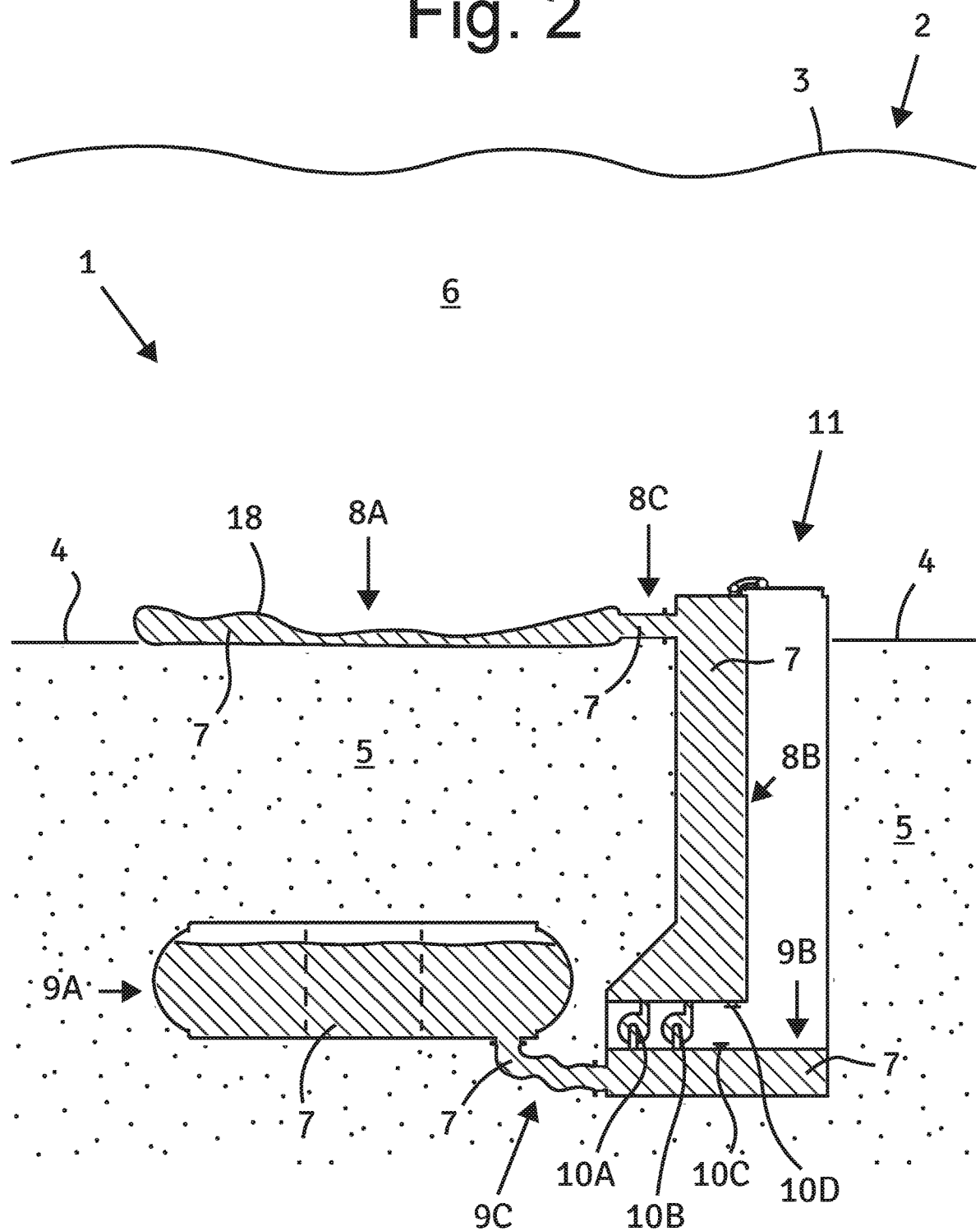
FIG. 2 shows the example of FIG. 1 once again and in the same view, however, wherein in FIG. 2 the potential energy of the working liquid within the reservoir structure is less than in FIG. 1.

Reference is first made to the embodiment of FIGS. 1-2. The reference signs used in the embodiment of FIGS. 1-2 are referring to the above-mentioned parts and aspects of the invention, as well as to related parts and aspects, in the following manner.

1 - - - energy storage system
2 - - - waterbody
3 - - - water surface of the waterbody
4 - - - bottom surface of the waterbody
5 - - - waterbody underground
6 - - - water of the waterbody
8A, 8B, 8C - - - pressurizing reservoir
8A - - - deformable pressurizing subreservoir
8B - - - descending pressurizing subreservoir
8C - - - tubular connective pressurizing subreservoir
9A, 9B, 9C - - - depressurizing reservoir
9A - - - buried depressurizing subreservoir
9B - - - shaft-integrated depressurizing subreservoir
9C - - - tubular connective depressurizing subreservoir
10A, 10B,
10C, 10D - - - energy storing and retrieving subsystem
10A - - - first pump, turbine or reversible hydroelectric turbine
10B - - - second pump, turbine or reversible hydroelectric turbine
10C - - - depressurizing-side connection for pump, turbine, or the like
10D - - - pressurizing-side connection for pump, turbine, or the like
11 - - - shaft structure
18 - - - deformable wall structure Based on the above introductory description, including the brief description of the drawing figures, and based on the above-explained reference signs used in the drawing, the shown example of FIGS. 1-2 is for the greatest part readily self-explanatory. The following extra explanations are given.

The pressurizing reservoir 8A, 8B, 8C of the reservoir structure of the energy storage system 1 comprises the deformable pressurizing subreservoir 8A, which has the deformable wall structure 18, the descending pressurizing subreservoir 8B inside the shaft structure 11, and the tubular connective pressurizing subreservoir 8C, which is interconnecting the deformable pressurizing subreservoir 8A and the descending pressurizing subreservoir 8B.

In the shown example, the deformable wall structure 18 is of the bladder type. Except for the deformable wall structure 18 of the deformable pressurizing subreservoir 8A, all other wall structures of the pressurizing reservoir 8A, 8B, 8C are rigid in the shown example.

Furthermore, at least part of the underside of the deformable pressurizing subreservoir 8A may preferably be anchored and/or otherwise fixed relative to the underground 5, for example in and/or at and/or above the underground 5.

The depressurizing reservoir 9A, 9B, 9C of the reservoir structure of the energy storage system 1 comprises the buried depressurizing subreservoir 9A, the shaft-integrated depressurizing subreservoir 9B, which is integrated in the shaft structure 11, and the tubular connective depressurizing subreservoir 9C, which is interconnecting the buried depressurizing subreservoir 9A and the shaft-integrated depressurizing subreservoir 9B. In the shown example, the wall structures of the depressurizing reservoir 9A, 9B, 9C are rigid.

The energy storing and retrieving subsystem 10A, 10B, 10C, 10D of the energy storage system 1 comprises the shown units 10A and 10B. As an example, it is considered here that in FIGS. 1 and 2 the unit 10A is a pump and the unit 10B is a turbine.

The pump 10A is configured for pumping part of the working liquid 7 from the shaft-integrated depressurizing subreservoir 9B into the descending pressurizing subreservoir 8B. This pumping of the working liquid 7 has to be done against the action of the hydrostatic pressure of the working liquid 7 prevailing at the bottom of the descending pressurizing subreservoir 8B. This hydrostatic pressure of the working liquid 7 at the bottom of the descending pressurizing subreservoir 8B depends upon the total vertical height of the water 6 in the waterbody 2 and of the working liquid 7 in the pressurizing reservoir 8A, 8B, 8C, as measured from the water surface 3 of the waterbody 2 downwards to the bottom of the descending pressurizing subreservoir 8B.

The turbine 10B is configured for releasing part of the working liquid 7 to flow from the descending pressurizing subreservoir 8B into the shaft-integrated depressurizing subreservoir 9B. This flow of the working liquid 7 is substantially created by the action of the hydrostatic pressure of the working liquid 7 prevailing at the bottom of the descending pressurizing subreservoir 8B. The turbine 10B serves to generate electrical energy from this flow of the working liquid 7.

Instead of the unit 10A being a pump and the unit 10B being a turbine, each of these units 10A and 10B may also be a reversible hydroelectric turbine. Furthermore, instead of having only two of such units 10A and 10B, the energy storing and retrieving subsystem of the energy storage system 1 may have only one, or more than two of such units. To schematically illustrate this, FIGS. 1-2 are showing a depressurizing-side connection 10C at the depressurizing subreservoir 9B and a pressurizing-side connection 10D at the shaft-integrated depressurizing subreservoir 8B. Via these connections 10C and 10D, an additional pump and/or turbine and/or reversible hydroelectric turbine can be mounted.

In the situation of FIG. 1 the deformable pressurizing subreservoir 8A is shown in a relatively expanded condition, while in the situation of FIG. 2 the deformable pressurizing subreservoir 8A is shown in a relatively collapsed condition. In correspondence therewith, the pressurizing reservoir 8A, 8B, 8C contains a larger amount of the working liquid 7 in the situation of FIG. 1 than in the situation of FIG. 2, while the depressurizing reservoir 9A, 9B, 9C contains a smaller amount of the working liquid 7 in the situation of FIG. 1 than in the situation of FIG. 2. Accordingly, in FIG. 2 the potential energy of the working liquid 7 within the reservoir structure is less than in FIG. 1.

In the shown example, the depressurizing reservoir 9A, 9B, 9C is not necessarily ventilated relative to the interior of the shaft structure 11 and/or relative to the atmospheric outside environment. The air pressure in the depressurizing reservoir 9A, 9B, 9C may for example be kept very low, for example at substantially vacuum pressure level. However, embodiments are in principle possible in which the depressurizing reservoir 9A, 9B, 9C is ventilated relative to for example the atmospheric outside environment, for example via an air duct structure, which is extending upwards along the shaft structure 11, and which comprises a flexible hose which is extending from the shaft structure 11 through the water 6 towards the water surface 3, where the hose end is kept floating by a buoy.

Figure 3:
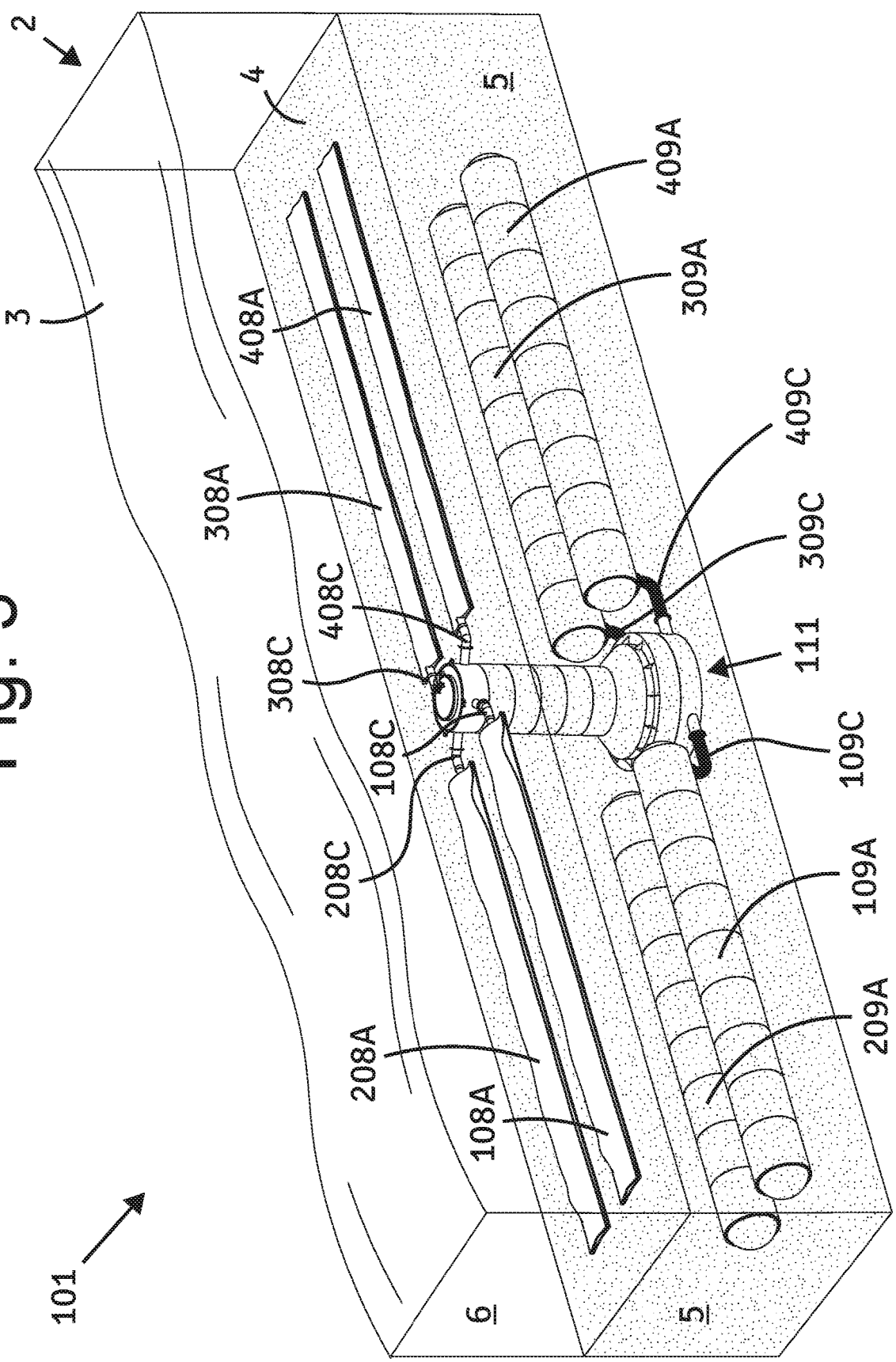
FIG. 3 shows, in a perspective view, an example of another embodiment of an energy storage system according to the invention.

Reference is now made to the other embodiment of FIG. 3. In the embodiment of FIG. 3 the same reference numerals 2, 3, 4, 5, 6 as used in FIGS. 1-2 are used for the waterbody, the water surface, the bottom surface, the waterbody underground and the water of the waterbody, respectively.

FIG. 3 shows the energy storage system 101 according to the invention, which has:
- a first, a second, a third and a fourth pressurizing reservoir, each of which is similar to the pressurizing reservoir 8A, 8B, 8C of FIGS. 1-2;
- a first, a second, a third and a fourth depressurizing reservoir, each of which is similar to the depressurizing reservoir 9A, 9B, 9C of FIGS. 1-2;
- a first, a second, a third and a fourth energy storing and retrieving subsystem, each of which is similar to the energy storing and retrieving subsystem 10A, 10B, 10C, 10D of FIGS. 1-2.

In FIG. 3, visible parts of said similar first, second, third and fourth reservoirs/subsystems are indicated by the same reference signs as in the embodiment of FIGS. 1-2, on the understanding that in FIG. 3 the numerals in the reference signs of FIGS. 1-2 have been increased by 100, 200, 300 and 400 for said first, second, third and fourth reservoirs/subsystems, respectively.

In FIG. 3 it is seen that all said similar first, second, third and fourth reservoirs/subsystems are mutually combined with one single shaft structure 111.

In FIG. 3 it is further seen that each of the buried depressurizing subreservoirs 109A, 209A, 309A, 409A is extending with a certain degree of "horizontal flatness". That is, the flatness of said buried depressurizing subreservoirs is in horizontal direction, as opposed to a situation in which, for example, the longitudinal direction of an elongated buried depressurizing subreservoir would extend vertically. In the above introduction of the present document a "horizontal flatness ratio" was defined, while it was mentioned there that the horizontal flatness ratio of the at least one buried depressurizing subreservoir should preferably be at least 2.0, more preferably at least 4.0, and yet more preferably at least 8.0. Such preferable minimum values of the horizontal flatness ratio of the at least one buried depressurizing subreservoir are advantageous for several reasons.

One advantage is that the mentioned degrees of horizontal flatness allow for optimally controlling the hydrostatic pressure loads on pumps and/or turbines and/or the like of the energy storing and retrieving subsystem during said displacing part of the working liquid from the depressurizing reservoir into the pressurizing reservoir and during said releasing part of the working liquid to flow from the pressurizing reservoir into the depressurizing reservoir. That is, said hydrostatic pressure loads can be controlled towards optimal values for realizing optimal efficiencies of the pumps and/or turbines and/or the like.

Another advantage is that the mentioned degrees of horizontal flatness allow for easy scaling-up of storing capacity of the at least one buried depressurizing subreservoir in horizontal direction, without affecting said optimal control of the hydrostatic pressure loads on pumps and/or turbines and/or the like. After all, said scaling-up in horizontal direction can be done without affecting the overall height of the at least one buried depressurizing subreservoir.

While the invention has been described and illustrated in detail in the foregoing description and in the drawing figures, such description and illustration are to be considered exemplary and/or illustrative and not restrictive; the invention is not limited to the disclosed embodiments.

For example, in the shown examples the deformable wall structures of the pressurizing reservoir are of the bladder type. However, many various other deformable wall structures of such a pressurizing reservoir may be applied, such as for example deformable wall structures which are extendible and contractable in a telescopic manner.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single part may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. An energy storage system for storing energy in a waterbody, the waterbody having a water surface and a bottom surface, said bottom surface bounding a waterbody underground under the waterbody, wherein the energy storage system comprises:
    a reservoir structure, which comprises a pressurizing reservoir and a depressurizing reservoir, each of which is configured for holding a working liquid beneath the water surface of the waterbody and separated from water of the waterbody in such manner that the working liquid within the pressurizing reservoir and the depressurizing reservoir and the water of the waterbody cannot mix with one another, wherein:
        at least one deformable pressurizing subreservoir of the pressurizing reservoir is at least partly extending in the waterbody, has a liquid-impermeable deformable wall structure, and is configured for pressurizing the working liquid contained within the pressurizing reservoir by deformation of the deformable wall structure under influence of hydrostatic pressure of the water of the waterbody acting on the deformable wall structure, and
        the depressurizing reservoir is arranged and configured for shielding the working liquid within the depressurizing reservoir from pressurization under influence of the hydrostatic pressure of the water of the waterbody;
    an energy storing and retrieving subsystem configured for:
        guiding the working liquid to flow from the pressurizing reservoir into the depressurizing reservoir, and vice versa,
        storing energy by increasing a potential energy of the working liquid within the reservoir structure by displacing part of the working liquid from the depressurizing reservoir into the pressurizing reservoir, thereby causing said at least one deformable pressurizing subreservoir, by said deformation of the deformable wall structure, to expand against the action of said hydrostatic pressure of the water of the waterbody, and
        retrieving stored energy by decreasing the potential energy of the working liquid within the reservoir structure by releasing part of the working liquid to flow from the pressurizing reservoir into the depressurizing reservoir, thereby causing said at least one deformable pressurizing subreservoir, by said deformation of the deformable wall structure, to collapse under the action of said hydrostatic pressure of the water of the waterbody;
    wherein at least one buried depressurizing subreservoir of the depressurizing reservoir is an artificial structure, which has been buried under a vertical column of said waterbody underground, wherein said vertical column has a height of at least 5 meters, and
    wherein said at least one buried depressurizing subreservoir is arranged at least 5 meters lower than said at least one deformable pressurizing subreservoir, which is extending in the waterbody, in the sense that, whereby in operation of the energy storage system, the working liquid inside said at least one buried depressurizing subreservoir is at least 5 meters lower than the working liquid inside said at least one deformable pressurizing subreservoir,
    wherein a horizontal flatness ratio of said at least one buried depressurizing subreservoir is at least 2.0, said horizontal flatness ratio being defined as a quotient having a numerator and a denominator,
    wherein the numerator is a square root of a surface area of a projection area of a horizontal reference plane, said projection area being obtained by vertically projecting said at least one buried depressurizing subreservoir onto said horizontal reference plane, and
    wherein the denominator is an overall vertical height of said at least one buried depressurizing subreservoir.

2. The energy storage system according to claim 1, further comprising a shaft structure, wherein:
    the shaft structure is extending at least from the bottom surface of the waterbody downwards through said waterbody underground,
    at least one descending pressurizing subreservoir of the pressurizing reservoir is extending in or at the shaft structure and downwards along the shaft structure, and
    the energy storing and retrieving subsystem is at least partly located in or at the shaft structure such that said displacing part of the working liquid from the depressurizing reservoir into the pressurizing reservoir, and said releasing part of the working liquid to flow from the pressurizing reservoir into the depressurizing reservoir, take place in or at the shaft structure and via said at least one descending pressurizing subreservoir.

3. The energy storage system according to claim 1, wherein said energy storing and retrieving subsystem comprises at least one pump for said displacing part of the working liquid from the depressurizing reservoir into the pressurizing reservoir.

4. The energy storage system according to claim 1, wherein said energy storing and retrieving subsystem comprises at least one turbine for said releasing part of the working liquid to flow from the pressurizing reservoir into the depressurizing reservoir.

5. The energy storage system according to claim 1, wherein said energy storing and retrieving subsystem comprises at least one reversible hydroelectric turbine, which can operate both as a turbine-generator and, in reverse, as an electric motor-driven pump, for said displacing part of the working liquid from the depressurizing reservoir into the pressurizing reservoir, as well as for said releasing part of the working liquid to flow from the pressurizing reservoir into the depressurizing reservoir.

6. The energy storage system according to claim 1, wherein:
    said vertical column has a height of at least 10 meters, and
    said at least one buried depressurizing subreservoir is arranged at least 10 meters lower than said at least one deformable pressurizing subreservoir, which is extending in the waterbody, whereby in operation of the energy storage system, the working liquid inside said at least one buried depressurizing subreservoir is at least 10 meters lower than the working liquid inside said at least one deformable pressurizing subreservoir.

7. The energy storage system according to claim 1, wherein said horizontal flatness ratio of said at least one buried depressurizing subreservoir is at least 4.0.

8. The energy storage system according to claim 7, wherein said horizontal flatness ratio of said at least one buried depressurizing subreservoir is at least 8.0.

9. The energy storage system according to claim 1, wherein the at least one buried depressurizing subreservoir is buried directly under the waterbody.

10. The energy storage system according to claim 1, wherein the depressurizing reservoir is not ventilated relative to an atmospheric outside environment.

11. An energy storage system for storing energy in a waterbody, the waterbody having a water surface and a bottom surface, said bottom surface bounding a waterbody underground under the waterbody, wherein the energy storage system comprises:
    a reservoir structure, which comprises a pressurizing reservoir and a depressurizing reservoir, each of which is configured for holding a working liquid beneath the water surface of the waterbody and separated from water of the waterbody in such manner that the working liquid within the pressurizing reservoir and the depressurizing reservoir and the water of the waterbody cannot mix with one another, wherein:
    at least one deformable pressurizing subreservoir of the pressurizing reservoir is at least partly extending in the waterbody, has a liquid-impermeable deformable wall structure, and is configured for pressurizing the working liquid contained within the pressurizing reservoir by deformation of the deformable wall structure under influence of hydrostatic pressure of the water of the waterbody acting on the deformable wall structure, and
    the depressurizing reservoir is arranged and configured for shielding the working liquid within the depressurizing reservoir from pressurization under influence of the hydrostatic pressure of the water of the waterbody;
    an energy storing and retrieving subsystem configured for:
    guiding the working liquid to flow from the pressurizing reservoir into the depressurizing reservoir, and vice versa,
    storing energy by increasing a potential energy of the working liquid within the reservoir structure by displacing part of the working liquid from the depressurizing reservoir into the pressurizing reservoir, thereby causing said at least one deformable pressurizing subreservoir, by said deformation of the deformable wall structure, to expand against the action of said hydrostatic pressure of the water of the waterbody, and
    retrieving stored energy by decreasing the potential energy of the working liquid within the reservoir structure by releasing part of the working liquid to flow from the pressurizing reservoir into the depressurizing reservoir, thereby causing said at least one deformable pressurizing subreservoir, by said deformation of the deformable wall structure, to collapse under the action of said hydrostatic pressure of the water of the waterbody;
    wherein at least one buried depressurizing subreservoir of the depressurizing reservoir is an artificial structure, which has been buried under a vertical column of said waterbody underground, wherein said vertical column has a height of at least 5 meters,
    wherein said at least one buried depressurizing subreservoir is arranged at least 5 meters lower than said at least one deformable pressurizing subreservoir, which is extending in the waterbody, whereby in operation of the energy storage system, the working liquid inside said at least one buried depressurizing subreservoir is at least 5 meters lower than the working liquid inside said at least one deformable pressurizing subreservoir, and
    wherein an air pressure within the depressurizing reservoir is kept at substantially vacuum pressure level.

\* \* \* \* \*